Figure 1:
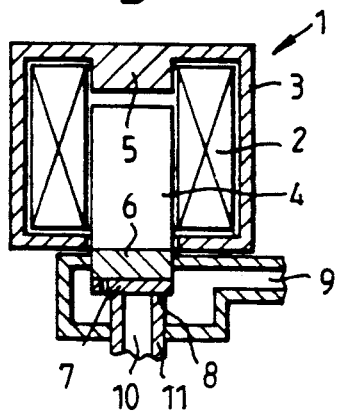

United States Patent [19]

Abrahamsen et al.

[11] Patent Number: 5,265,841
[45] Date of Patent: Nov. 30, 1993

[54] PLUNGER ARMATURE ELECTROMAGNETIC VALVE

[75] Inventors: John G. Abrahamsen, Nordborg; Kurt Harck, Sonderborg; Holger Nicolaisen, Nordborg, all of Denmark

[73] Assignee: Danfoss A/S, Nordborg, Denmark

[21] Appl. No.: 4,509

[22] Filed: Jan. 14, 1993

[30] Foreign Application Priority Data

Jan. 21, 1992 [DE] Fed. Rep. of Germany ....... 4201450

[51] Int. Cl.⁵ .............................................. F16K 31/06
[52] U.S. Cl. .................. 251/75; 251/129.15; 251/129.19
[58] Field of Search ................. 251/75, 129.19, 129.15, 251/129.2

[56] References Cited

U.S. PATENT DOCUMENTS 3,827,672  8/1974  Stampfli ........................ 251/129.19
4,601,458  7/1986  Sheppard ....................... 251/129.19
4,790,346  12/1988 Kolze et al. ................. 251/129.19 X

FOREIGN PATENT DOCUMENTS 885678  11/1981  U.S.S.R. ......................... 251/129.19

Primary Examiner—Arnold Rosenthal
Attorney, Agent, or Firm—Wayne B. Easton

[57] ABSTRACT

An electromagnetic valve assembly having a valve unit with a valve seat and a coil arrangement. An armature is slidably disposed in the bore of the coil arrangement and has one end cooperable with a core head to form an air gap and at the other end a closure device cooperable with the valve seat. The closure device has a ring shaped mounting part attached to the armature and a closure element in the form of a radially inwardly extending tongue-like part which is resiliently connected to the mounting part and is cooperable with the valve seat to maximize the operating effects of the coil arrangement.

13 Claims, 1 Drawing Sheet

PLUNGER ARMATURE ELECTROMAGNETIC VALVE

The invention relates to a plunger armature electromagnetic valve with an armature movable in a coil arrangement, the armature having fastened to it a closure member which is formed at least partly from resilient material and in the closed state lies on a valve seat.

An electromagnetic valve of this kind is known, for example, from EP 0 151 563 A3. The known valve is in the form of a three-way valve in which one of the valve seats is formed by the end of a tube guided through the armature, while the other valve seat lies opposite the first valve seat. At its end the armature has a hollow-cylindrical recess with a circumferential groove in the circumferential wall thereof, in which a resilient disc is arranged as the closure member. The resilient disc can be brought into engagement with one or other valve seat. The armature is able to be moved beyond a position in which the disc engages the corresponding valve seat, the disc arching somewhat as this occurs.

When electromagnetic valves are used to interrupt the flow of a fluid in flow, there may be difficulties with the opening of the valve. Occasionally, a suction effect occurs which makes opening of the valve, that is, a separation of the closure member and the valve seat, difficult. This separation consequently requires a relatively high magnetic force. This is all the more disadvantageous considering that in the case of valves which are closed in the non-activated state, it is precisely at the start of the movement of the armature that there is only a relatively low force available. Remedial action has previously consisted in the coil arrangement and the armature being of correspondingly large dimensions or being designed to accept a relatively large current. It is obvious that that solution is not satisfactory. There is often no space available for relatively large electromagnetic valves. A large current automatically leads to increased heat generation and therefore to losses which should, if possible, be avoided.

The invention is therefore based on the problem of providing an electromagnetic valve in which the force necessary to open the valve can be reduced.

This problem is solved according to the invention in an electromagnetic valve of the type mentioned in the introduction in that the closure member has a tongue that is at least partly resilient, which in the closed position lies with a first portion on the valve seat and has a second portion extending laterally beyond the valve seat, the connection with the armature being effected only by way of the second portion.

By this means, the valve is able to remain closed in the first phase of the armature movement. The armature here needs merely to overcome the resilient force of the resilient tongue, but this is less than the retentive force of the tongue on the valve seat produced, for example, by a suction effect. After a certain movement, the armature enters a region where the tongue force becomes greater. In addition, the armature has acquired a certain kinetic energy as a result of its movement. The "impulse" of the armature and the increased attractive force now act outside the valve seat. The result is that a torque is exerted on the tongue which lifts the tongue initially at one side away from the valve seat. A small opening, but one which is sufficient to allow a flow to commence, appears. The tongue can now be moved further away from the valve seat, following the movement of the armature as it does so. Despite the suction effect caused by the fluid flowing through the gap, the force is sufficient to lift the tongue completely away from the valve seat. The tongue then moves resiliently back into its position of rest, thereby completely freeing the valve seat.

In a construction of that kind, the magnetic force required to lift the closure member from the valve seat is considerably smaller. The coil arrangement can therefore be designed for a substantially smaller force. The overall size can be reduced. Electricity consumption drops.

In a preferred embodiment, the tongue is resilient between the first and the second portion. In this embodiment, a tilting of the tongue away from the valve seat is effected. If the entire tongue is resilient, the tongue can be rolled away from the valve seat.

In an especially advantageous construction, provision is made for the closure member to comprise a circular ring-shaped plate, the tongue being joined to the plate and projecting inwards. A plate of that kind can easily be secured in the armature. The radial forces occurring on movement of the tongue can be accommodated on all sides by the construction in the form of a circular ring.

It is here preferable for the tongue and the plate to be of integral construction. The combination of tongue and plate can be, for example, punched or cut from a blank. The join is then maintained by way of a web remaining between the tongue and circular ring-shaped plate. This web can be the width of the tongue or even somewhat wider.

Advantageously, at its end facing the valve seat the armature has a hollow-cylindrical recess in which the plate is arranged. The plate is fixed laterally all round by this recess. A stable position of the tongue in relation to the valve sat is thereby created. Lateral forces which occur as the valve opens are assimilated.

A circumferential groove is preferably provided in the circumferential wall of the recess or a circumferential projection is provided on the circumferential wall, the plate being held by this groove or projection, if desired with the interposition of a resilient ring. The plate is thus held in the recess in a simple manner against tensile forces.

In an embodiment that is especially easy to manufacture, the edge of the recess is flanged inwards, a flange ring being provided in particular between the flange edge and the plate. After insertion of the plate in the recess, the outer edge of the recess is flanged inwards, whereby the plate is held securely in the recess. The flange ring can, if desired, in this manner protect the plate, so that it is not damaged by the flanging operation.

Preferably, in its state of rest the tongue lies against the armature. The state of rest is defined in that here no tensile forces act on the tongue. This is the case, for example, when the valve is completely open, the tongue therefore being lifted away from the valve seat completely. Another state of rest is obtained when the armature presses the tongue downwards onto the valve seat. In the state of rest, the tongue is therefore supported at least on one side by the armature, which leads to a reduction in vibration and thus in noise. In addition, this has the advantage that the tongue is supported virtually completely by the armature as the valve is closed, so that really high closing forces can be applied.

Advantageously, the tongue is made from stainless spring steel. This material is sufficiently resilient to yield to an adequate degree when the valve opens. On the other hand, it has the required strength to be able to accommodate tensile forces occurring during opening of the valve and to withstand repeated valve actuation.

In order to improve the closing behaviour, in an advantageous construction provision is made for a resilient layer, in particular of a rubber-like material or plastics, to be arranged between the tongue and the valve seat. Such a material can be, for example, a natural or synthetic rubber, or Teflon. The resilient layer has a certain flexibility so that it is able to compensate for unevennesses in the surface of the vale seat and/or tongue.

It is preferable here for the resilient layer to be arranged on the tongue. If there are leaks in the valve, the tongue, if desired with the ring-shaped plate, can be more readily exchanged than the valve seat.

To apply the layer, a construction is preferred in which the resilient layer is applied to the tongue by vulcanizing, fusing, adhesion or spray-coating. The resilient layer is then firmly joined to the tongue so that as the tongue lifts away from the valve seat the resilient layer follows immediately.

In another construction, provision can be made for the resilient layer to be in the form of a separate part which has an extension protruding from the layer and pushed through an opening in the tongue. In that case the resilient layer can be exchanged separately from the tongue. The resilient layer can be thicker. Its thickness can be adapted to various requirements. By changing the thickness of this part the opening behaviour of the valve can be influenced, without the actuator having to be altered.

It is preferable here for the extension to be mushroom-shaped and to have a circumferential projection engaging behind the tongue. For assembly, the part forming the resilient layer can simply be pushed with its mushroom-shaped extension through the opening in the tongue. By virtue of the circumferential projection it is self-locking. It can be removed from the tongue only by applying substantial force.

Figure 2:
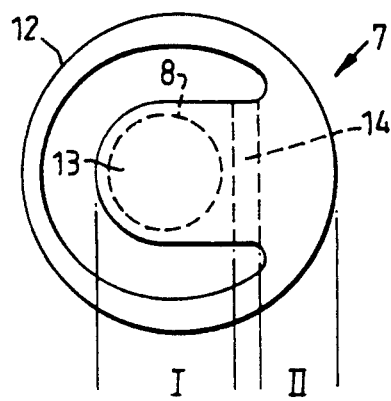
Figure 3A:
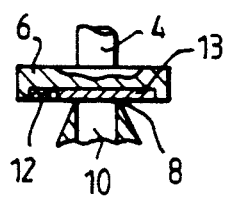
Figure 3B:
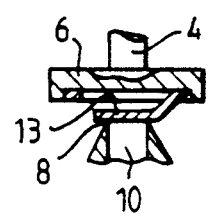
Figure 3C:
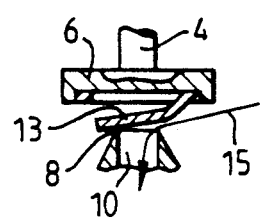
Figure 3D:
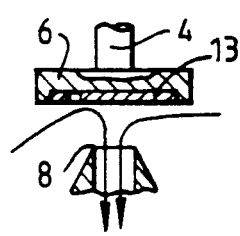
Figure 4:
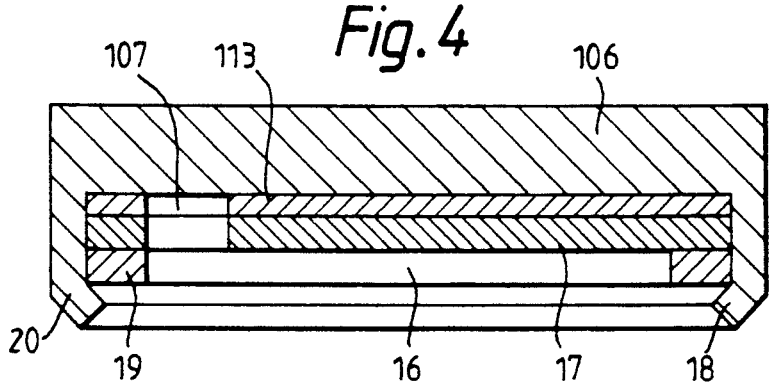
Figure 5:
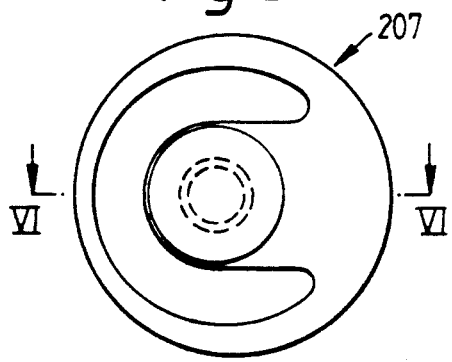
Figure 6:
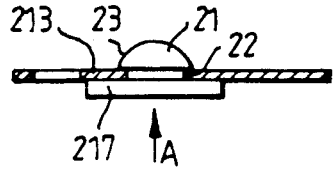

The invention is described hereinafter with reference to preferred embodiments and in conjunction with the drawing, in which FIG. 1 shows a basic construction of an electromagnetic valve, FIG. 2 shows a plate with a tongue, FIG. 3 shows a movement sequence as the valve opens, FIG. 4 shows a further construction of a closure member, FIG. 5 shows a further construction of a plate with a tongue, and FIG. 6 shows a section VI—VI according to FIG. 5.

A plunger armature electromagnetic valve 1 comprises a coil arrangement 2 which is surrounded by a yoke 3. An armature 4 is movably mounted in the coil arrangement 2. When the coil arrangement 2 has current applied to it, the armature 4 is drawn out of the rest position illustrated in FIG. 1 to bear against a core head 5 of the yoke 3. At the other end of the armature 4 there is arranged a closure member 6 which lies with a closure plate 7, shown in greater detail in FIG. 2, on a valve seat 8. In this closed state the closure plate 7, together with the valve seat 8, interrupts a flow path from an inlet 9 to an outlet 10. For the sake of simplicity, the valve seat 8 is here illustrated as the end of a tube 11 forming the outlet 10. Ordinarily, however, the valve seat is machined in known manner.

FIG. 2 shows the closure plate 7. This consists of a circular ring 12 to which a tongue 13 is joined, the tongue 13 projecting inwards into the circular ring 12. The valve seat 8 is indicated by broken lines. It can be seen that the tongue 13 comprises a first portion I, with which it lies on the valve seat 8, and a second portion II projecting laterally beyond the valve seat 8, forming the transition of the tongue into the circular ring 12. As the circular ring 12 is joined to the closure member 6 of the armature 4, the connection of the tongue 13 to the armature 4 is effected only by way of this second portion II.

The tongue 13 and the circular ring 12 are of integral construction. They are joined together by means of a web region 14 between the first portion I and the second portion II. This allows very simple manufacture. For example, the entire closure plate 7 can be punched from a plate-like blank. In principle, it is also possible, however, to assemble the tongue 13 and the circular ring 12 from two separate parts. In the one-piece form, the entire closure plate 7 consists of a stainless spring steel, so that the entire plate is resilient. In principle, however, it is sufficient for the tongue 13 to be resilient. In an extreme case, it would even be sufficient for the web region 14 between the first portion I and the second portion II to be resilient.

The mode of operation of the valve with the closure plate 7 is illustrated diagrammatically in FIG. 3. FIG. 3a shows the valve in its closed state. The tongue 13 is lying on the valve seat 8. The closure member 6 is supporting the tongue. It may, if desired, press the tongue flat against the valve seat 8.

In FIG. b, the armature 4 has moved a short distance in the direction of the opening position. The tongue 13 remains on the valve seat 8. For this movement the armature 4 merely has to overcome the resilient forces of the tongue 13. The armature 4 has now been accelerated, that is to say, it has a certain kinetic energy. Furthermore, it approaches closer to the core head 5 so that the air gap in the magnetic circuit becomes smaller. The force on the armature increases. The armature is now able, as illustrated in FIG. 3c, to lift the tongue 13 at least at one side away from the valve seat 8. The forces acting outside the valve seat 8, which exert a lever action on the tongue 13, allow this to happen. Fluid is thus able to flow into the outlet 10, as indicated by the arrow 15. The difference in pressure between inlet 9 and outlet 10, which has until now contributed to holding the tongue 13 on the valve seat 8, is thereby partially compensated. The tongue 13 now has essentially only suction forces acting on it which are produced by the fluid flowing in the direction of the arrow 15. Counteracting these forces is the restoring force of the tongue 13 which becomes greater and greater as the armature 4 continues to move upwards, so that the tongue 13 finally lifts completely away from the valve seat and comes to rest on the closure member 6 again. This position is the rest position of the tongue. In this rest position the tongue is unable to move freely, since it is movable only in one direction, namely, away from the closure member 6. This contributes to a reduction in noise.

FIG. 4 shows another construction of the closure member 106, in which parts that correspond to those of FIGS. 1 to 3 are provided with reference numbers increased by 100. The closure member 106 has a hollow-cylindrical recess 16 in which the closure plate 107 is inserted. In plan view the closure plate 107 is the same shape as the closure plate 7 illustrated in FIG. 2. However, it has a coating 17 of rubber, Teflon or a different plastics material which is equally resilient, and in particular resilient in response to pressure. This coating 17 is, for example, vulcanized onto the closure plate 107. It is arranged between the closure plate 107 and the valve seat, not shown in detail, and contributes to an improved seal as the closure plate 107 and valve seat interact, since it helps to compensate for any unevennesses in the surfaces.

The inner circumference of the recess 16 has a circumferential projection 18 which projects inwards into the recess 16. It holds the closure plate 107 fixedly against axial movement, that is to say, movement in the direction of movement of the armature 4. In this particular embodiment, the projection 18 is formed by a flange, a flange ring 19 being arranged between the projection 18 and the closure plate 107. In manufacture, first of all the coated closure plate 107 is introduced into the recess 16. The flange ring 19 is then positioned on the coating 17 of the valve plate 117[1]. The outer wall of the closure member 6 surrounding the recess 16 is then flanged inwards. As this is done, the closure plate 107 comes to lie flat on the closure member 106, namely, on the floor of the recess 16.

[1] Presumably in error for "closure plate 107"-translator.

FIGS. 5 and 6 show a further embodiment in which parts that correspond to those of FIGS. 1 to 3 are provided with reference numbers increased by 200. In plan view, the closure plate 207 is the same shape as the closure plate 7 of FIG. 2. However, in FIG. 5 it is shown looking from below, that is to say, in the direction of the arrow A from FIG. 6. In place of a coating 17 applied by vulcanizing, the closure plate 207 has a resilient member 217 which is of plate-like construction and has protruding from the plate 217 a mushroom-shaped extension 21 which is guided through an opening 22 in the closure plate 207, or strictly speaking, in the tongue 213. The mushroom-shaped extension 21 has a circumferential projection 23 which engages behind the tongue 213. Once the extension 21 has been introduced through the opening 22 in the tongue 213, the resilient plate 217 is fixed to the tongue 213.

We claim:

1. An electromagnetic valve assembly, comprising, a valve unit having a valve seat,
a coil arrangement including a coil unit defining a central bore,
a core head fixedly disposed relative to and in axial alignment with said bore,
an armature slidably disposed in said bore having one end thereof cooperable with said core head to form an air gap and closure means at the other end thereof cooperable with said valve seat,
said closure means having a mounting part fixedly attached to a peripheral portion of said armature and a closure part cooperable with said valve seat extending radially inwardly from said mounting part and being resiliently connected to said mounting part.

2. An electromagnetic valve assembly according to claim 1 wherein said closure means is formed from a flat resilient material.

3. An electromagnetic valve assembly according to claim 1 wherein said closure part is tongue shaped.

4. An electromagnetic valve assembly according to claim 1 wherein said mounting part is ring shaped.

5. An electromagnetic valve assembly according to claim 1 wherein said armature has a cylindrically shaped recess at the valve end thereof in which said closure means is mounted.

6. An electromagnetic valve assembly according to claim 5 wherein a groove is provided in said recess for retaining said mounting part of said closure means.

7. An electromagnetic valve assembly according to claim 6 wherein retaining means in the form of flanged ring is provided in said recess adjacent said groove.

8. An electromagnetic valve assembly according to claim 1 wherein when said valve assembly is in a state of rest said closure part lies against said armature.

9. An electromagnetic valve assembly according to claim 1 wherein said closure part is made form stainless spring steel.

10. An electromagnetic valve assembly according to claim 1 wherein when said valve assembly is in a state of rest said closure part lies against and between said armature and said valve seat.

11. An electromagnetic valve assembly according to claim 1 wherein said closure part comprises a metal sheet part and a resilient layer of rubber-like material or a plastic attached thereto which is engageable with said valve seat.

12. An electromagnetic valve assembly according to claim 11 wherein said resilient layer is a separate part having an extension thereof protruding through an opening in said closure part.

13. An electromagnetic valve assembly according to claim 1 wherein said closure means is a ring shaped plate having an annular rim section and a radially inwardly extending tongue-like part cooperable with said valve seat, said tongue-like part being moveable relative to said rim section to allow raising of said rim section while said tongue-like part continues to engage said valve seat.

* * * * *